US009473728B2

(12) United States Patent
Jiang et al.

(10) Patent No.: US 9,473,728 B2
(45) Date of Patent: *Oct. 18, 2016

(54) HOME AUDIO VIDEO DISPLAY DEVICE (AVDD) AS SENSOR MONITOR

(71) Applicant: Sony Corporation, Tokyo (JP)

(72) Inventors: Libiao Jiang, San Diego, CA (US); Adam Li, Solana Beach, CA (US); Aixin Liu, San Diego, CA (US); Djung Nguyen, San Diego, CA (US); Frederick J. Zustak, Poway, CA (US)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/595,463

(22) Filed: Jan. 13, 2015

(65) Prior Publication Data

US 2015/0124169 A1 May 7, 2015

Related U.S. Application Data

(63) Continuation-in-part of application No. 14/055,259, filed on Oct. 16, 2013, now Pat. No. 8,964,121, which is a continuation of application No. 13/314,349, filed on Dec. 8, 2011, now Pat. No. 8,605,218.

(51) Int. Cl.
*H04N 5/445* (2011.01)
*H04N 21/41* (2011.01)
*H04N 21/422* (2011.01)
*H04N 21/443* (2011.01)
*H04N 21/488* (2011.01)
*H04N 21/431* (2011.01)
*G08B 21/18* (2006.01)

(52) U.S. Cl.
CPC ............ *H04N 5/445* (2013.01); *G08B 21/182* (2013.01); *H04N 21/4131* (2013.01); *H04N 21/42201* (2013.01); *H04N 21/42202* (2013.01); *H04N 21/431* (2013.01); *H04N 21/4431* (2013.01); *H04N 21/4882* (2013.01); *H04N 2005/44521* (2013.01)

(58) Field of Classification Search
CPC ..................... H04N 21/2143; H04N 21/2146; H04N 21/218; H04N 21/2401; H04N 21/2402; H04N 21/2405; H04N 21/2407; H04N 21/44204; H04N 21/44222
USPC ........................ 348/563–565, 569, 552, 734; 700/19–20, 65–66, 90; 725/108, 132, 725/140, 152
See application file for complete search history.

(56) References Cited

U.S. PATENT DOCUMENTS

| | | | | |
|---|---|---|---|---|
| 5,923,250 A | * | 7/1999 | Pildner | G08B 13/191 250/342 |
| 7,755,052 B2 | * | 7/2010 | Micko | G01V 8/10 250/342 |
| 2004/0260407 A1 | * | 12/2004 | Wimsatt | G05B 15/02 700/19 |
| 2009/0022362 A1 | * | 1/2009 | Gagvani | G06T 7/2053 382/100 |

* cited by examiner

*Primary Examiner* — Trang U Tran
(74) *Attorney, Agent, or Firm* — John L. Rogitz

(57) ABSTRACT

Method, computer storage device, and system that establish communication with at least first and second sensors, receive information from the sensors, and determine whether the information from the first sensor satisfies a first alert threshold. It is also determined whether the information from the second sensor satisfies a second alert threshold. Responsive to a determination that the information from the first sensor satisfies the first alert threshold and that the information from the second sensor does not satisfy the second alert threshold, an alert signal is not generated. On the other hand, responsive to a determination that the information from the first sensor satisfies the first alert threshold and that the information from the second sensor satisfies the second alert threshold, the alert signal is generated for output thereof to a display device.

4 Claims, 5 Drawing Sheets

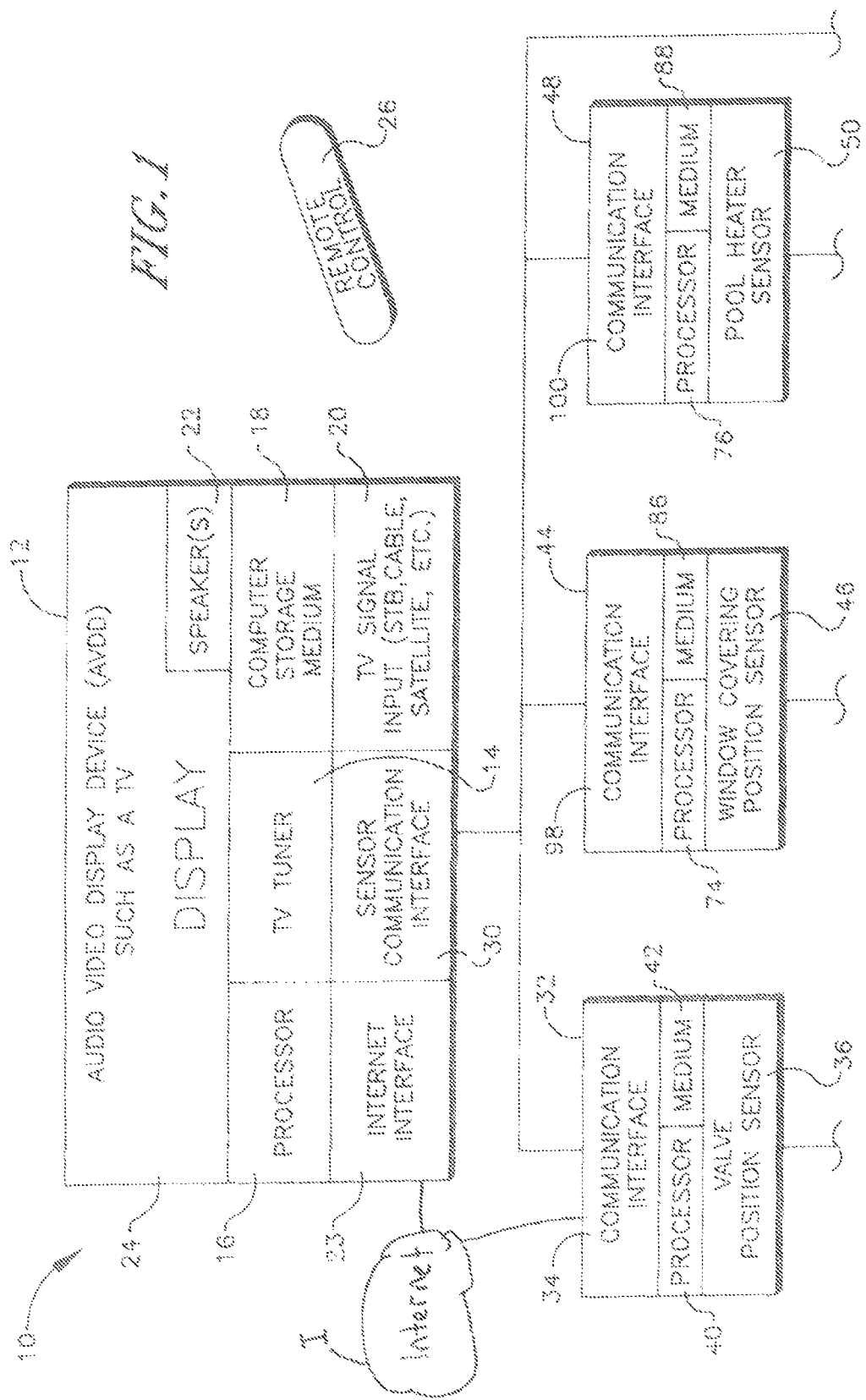

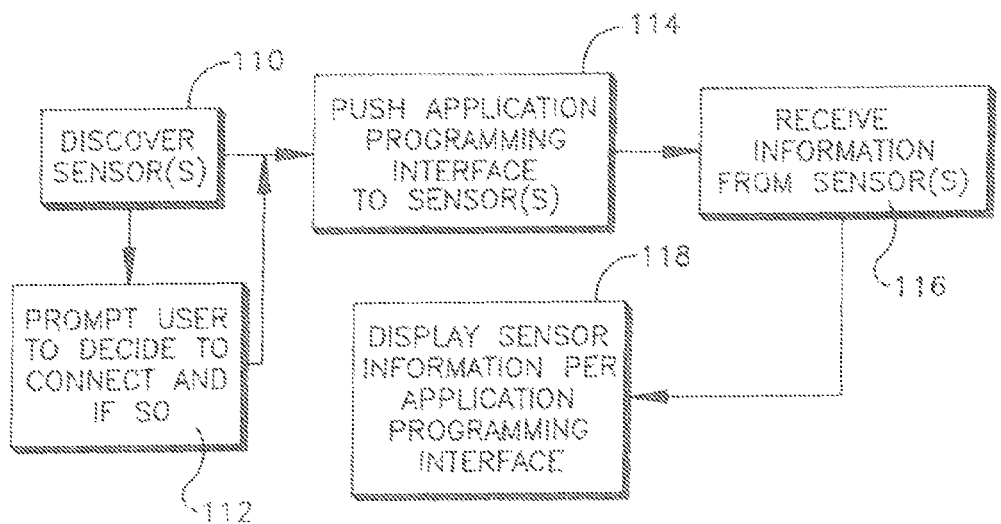
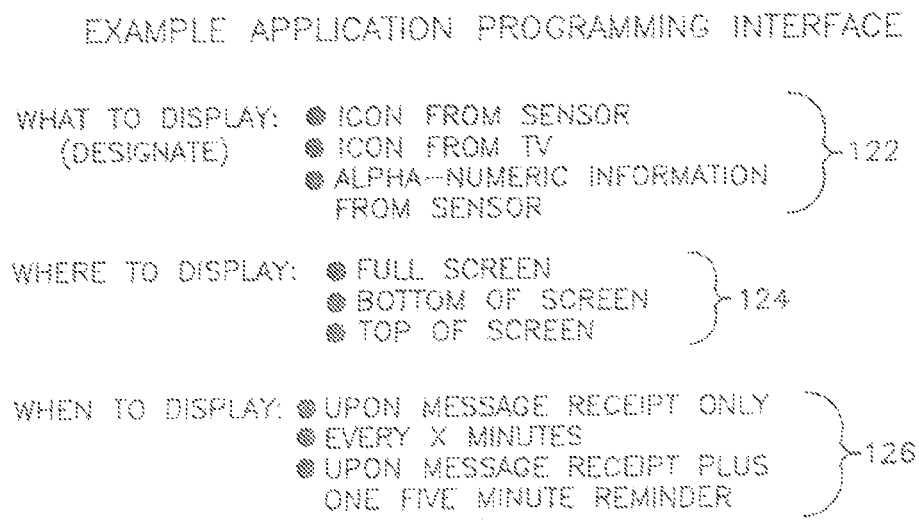

EXAMPLE SENSOR DISPLAYS

HOME AUDIO VIDEO DISPLAY DEVICE (AVDD) AS SENSOR MONITOR

FIELD OF THE INVENTION

The present application relates generally to the use of home audio video display devices (AVDD) such as TVs as sensor monitors.

BACKGROUND OF THE INVENTION

Current sensors, such as household environmental sensors, light sensors, and motion sensors, typically have individual displays associated with each sensor to display data from each sensor. Present principles recognize that the displays are often small and/or low-quality, making the displays difficult to read, understand, and ascertain useful information from, among other things.

Also understood herein, the displays are typically positioned in close proximity to its respective sensor such that multiple displays associated with different sensors are often not located in the same general location of e.g., a personal residence. Thus, a need has arisen to aggregate the information produced by one or more sensors in a single location for convenient viewing, rather than requiring multiple displays scattered in different locations to the display data and/or information and thereby making monitoring of the data and/or information from the sensors burdensome.

SUMMARY OF THE INVENTION

An audio video display device (AVDD) system includes a display and a processor controlling the display. The AVDD also includes a computer readable storage medium accessible to the processor and programmed with instructions that cause the processor to establish communication with at least one sensor. The instructions also cause the processor to receive information from the sensor conforming to an application programming interface (API) provided by a manufacturer of the AVDD to an entity affiliated with the sensor, or sent from the AVDD to the sensor and then present the information from the sensor on the display in accordance with the API.

If desired, the API can define, relative to the information from the sensor, content in the information from the sensor to be presented on the display, where the content is to be presented on the display, and when the content is to be presented on the display. As indicated above, in some embodiments the API may be provided by a manufacturer of the AVDD to an entity affiliated with the sensor, while in other embodiments API may be sent from the AVDD to the sensor. Even further, in some embodiments the API is sent from the AVDD to the sensor only in response to a viewer-input command.

In accordance with present principles, the sensors may be selected, though not required to be exclusively selected, from a group of sensors consisting of environmental sensors, ambient light sensors, door position sensors, window covering position sensors, pool heater energization sensors, motion sensors, and valve position sensors. Though present principles are described in reference to a personal residential environment, it is to be understood that the same principles may be applied to sensors and monitoring equipment in. e.g., a hospital or a public security environment as well.

If desired, the content can include alpha-numeric information only, an icon only, or both an icon and alpha-numeric information. Moreover, in some embodiments the system also includes the sensor. The sensor includes a processor accessing the API and sending the information to the AVDD in accordance with the API.

In another aspect, a method includes establishing communication between an audio video display device (AVDD) including a display and at least one sensor. The method then includes receiving information from the sensor(s) conforming to an application programming interface (API) provided by a manufacturer of the AVDD to an entity affiliated with the sensor(s), or sent from the AVDD to the sensor(s). According to the method, the information from the sensor(s) is then presented on the display in accordance with the API.

In yet another aspect, an audio video display device includes a display and a processor controlling the display. The device also includes a computer readable storage medium accessible to the processor and programmed with instructions that cause the processor to establish communication with at least one sensor. The instructions then cause the processor to receive information from the sensor(s) conforming to a software interface understandable by the AVDD. Thereafter, the instructions cause the processor to present the information from the sensor(s) on the display in accordance with the interface.

In other aspects, multiple sensors are monitored simultaneously to determine if an event has occurred (e.g., a combination of medical sensors; or home automation sensors indicating sound, movement, etc., that suggests a break in). A system according to present principles may re-send the sensor information to the cloud, to either facilitate processing, or to be made available to a third party for monitoring the sensor data (parents concerned about a child's security, home security company, medical professionals, etc.).

The details of the present invention, both as to its structure and operation, can best be understood in reference to the accompanying drawings, in which like reference numerals refer to like parts, and in which:

BRIEF DESCRIPTION OF THE DRAWINGS

FIG. 2 is a flow chart of example logic the AVDD can execute;

FIG. 3 is a schematic diagram showing the data structure of an example application programming interface (API) that may be pushed by the AVDD to the various sensors automatically when the viewer selects to connect to discovered sensors, or that may be published by a manufacturer of the AVDD to sensor manufacturers so that the sensor manufacturers may pre-program their sensors with the API;

DETAILED DESCRIPTION OF THE PREFERRED EMBODIMENT

Figure 1:
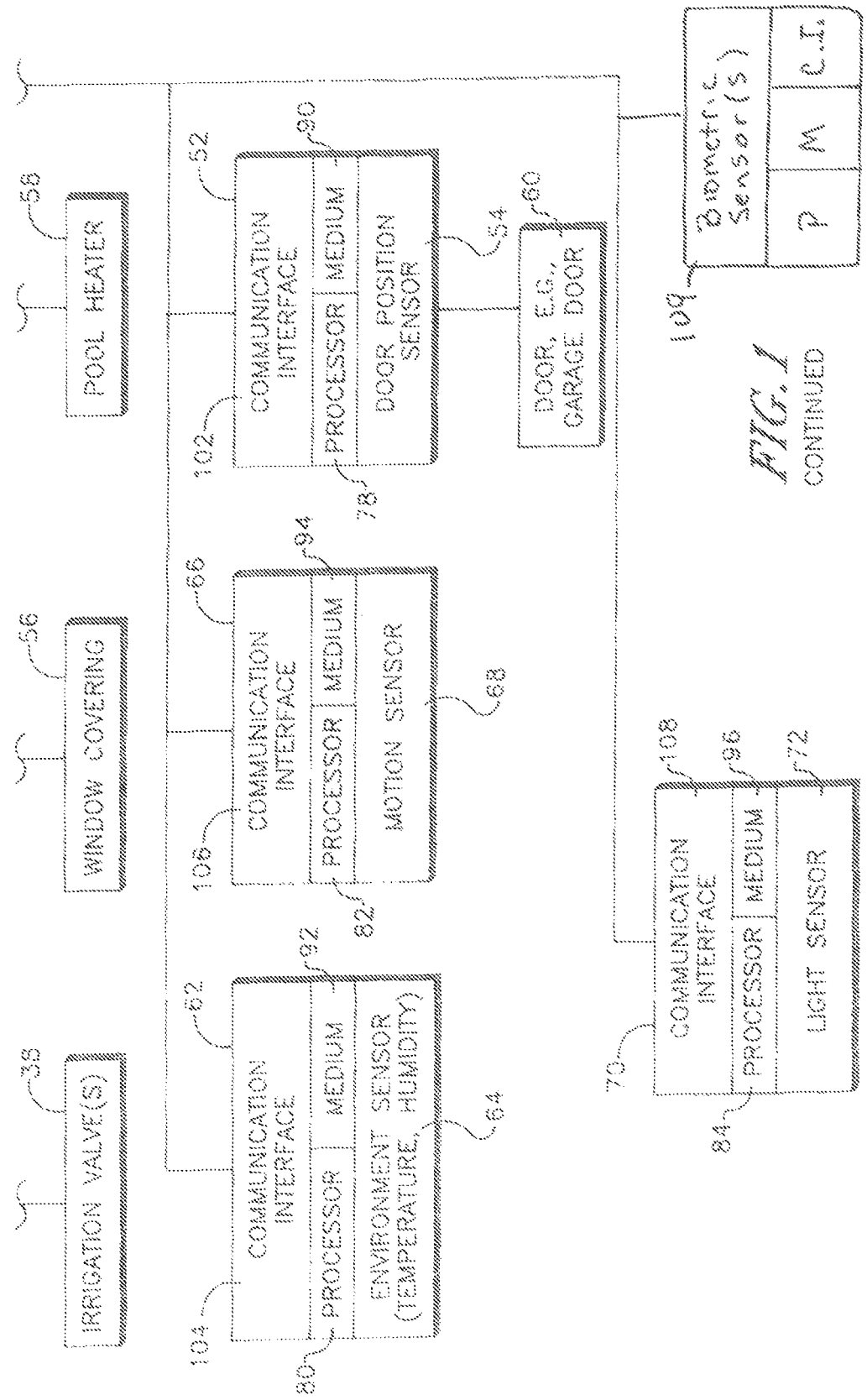
FIG. 1 is a block diagram of an example system, showing a home AVDD communicating with several example sensors for presenting information from the sensors on the AVDD.

Referring initially to FIG. 1, a block diagram of an example system including an audio video display device (AVDD) communicating with several example sensors for presenting information from the sensors on the AVDD is shown. It is to be understood that an AVDD in accordance with present principles may be a home AVDD such as, but not limited to, a TV. In some embodiments the TV may further be an Internet TV. Notwithstanding the foregoing, it is to be further understood that still other audio-video display devices may be used in accordance with present principles, such as smart phones, tablet computers, notebook computers, other types of computers, etc.

Thus, a non-limiting system 10 includes an audio video display device (AVDD) 12. The AVDD 12 includes a TV tuner 14 that receives TV programming and/or data and/or content for presentation on the AVDD 12. Further, the TV tuner 14 communicates with a processor 16 accessing a tangible computer readable storage medium 18 such as, but not limited to, disk-based or solid state storage. It is to be understood that the processor 16 can execute logic in accordance with present principles. The AVDD 12 may also include a non-limiting TV signal input 20 allowing the AVDD 12 to connect to, e.g., a television head end, cable communication link, or satellite communication link for receiving TV programming and/or data or content for presentation on the AVDD 12. Additionally, the AVDD 12 can output audio on one or more speakers 22.

Continuing in reference to FIG. 1, it is to be understood that the AVDD 12 can connect to the Internet using an internet interface 23 such as built-in wired or wireless modem that communicates with the processor 16 to, e.g., send and receive data over the internet "I" or receive streaming video. Without limitation, the Internet interface may be a Wi-Fi interface. Wireless telephony interfaces may also be used. The Internet "I" includes computers, typically servers, and data storage, along with communication switches.

Regardless of the source of the content, video is presented under control of the processor 16 on a display 24, such as a high definition TV (HDTV) flat panel display. In some embodiments, the display 24 may be a touch screen display. Also, user commands to the processor 16 may be wirelessly received from a remote commander (RC) 26 using, e.g., RF or infrared.

The AVDD 12 shown in FIG. 1 also has a sensor communication interface 30 that communicates with the processor 16 to execute the functions and logic in accordance with present principles, among other things. It is to be understood that the sensor communication interface 30 can also establish communication with one or more communication interfaces of respective sensors in accordance with present principles. FIG. 1 therefore shows various exemplary sensors with respective communication interfaces for communicating with the sensor communication interface 30 of the AVDD 12.

Thus, an irrigation valve position sensor assembly 32 includes a communication interface 34 that can communicate with the sensor communication interface 30 to send information sensed or gathered or the like by a valve position sensor 36. Note that while the interfaces 30, 34 are shown as separate components in addition to the Internet interface 23, it is to be understood that the communication interfaces between the AVDD 12 and the sensors may be via Internet interfaces such as Wi-Fi interfaces. Or, the interfaces may be short range interfaces such as sonic interfaces, IR interfaces, or Bluetooth interfaces. Thus, information from the sensors herein may be sent to the "cloud" (e.g., Internet "I") to facilitate processing of the sensor data and then sent back to the AVDD, and/or to facilitate making the data available to a third party for monitoring of the data and providing output signals and alarms to, e.g., wireless computing devices of parents for home/child security, medical professionals, etc.

The information pertains to the operation and/or status of one or more irrigation valves 38. The valve position sensor assembly 32 also includes a processor 40 communicating with the communication interface 34. In non-limiting embodiments, the processor 40 may cause the valve position sensor 36 to sense and/or gather information regarding the operation of the irrigation valves 38, and/or may receive information from the valve position sensor 36 regarding the operation of the irrigation valves 38. If desired, the processor 40 may store the information from the valve position sensor 36 on a storage medium 42. Regardless of whether the information is stored on the storage medium 42, the processor 40, being in communication with the communication interface 34, can provide the information from the valve position sensor 36 to the communication interface 34 and cause the communication interface 34 to send the information to the sensor communication interface 30 of the AVDD 12 so that the AVDD 12 can present the information.

FIG. 1 also shows a window covering position sensor assembly 44 that includes a window covering position sensor 46 for sensing the position and/or movement of a window covering, a pool heater sensor assembly 48 that includes a pool heater sensor 50 for sensing the status and/or operation of a pool heater and even the temperature of a pool, and a door position sensor assembly 52 that includes a door position sensor 54 for sensing information pertaining to the operation and/or status of a door 60 such as a residential garage door. Also shown in FIG. 1 is an environment sensor assembly 62 that includes an environment sensor 64 for sensing, e.g., the household temperature and humidity of the residence in which the AVDD 12 is disposed. FIG. 1 also includes a motion sensor assembly 66 that includes a motion sensor 68 for sensing motion and a light sensor assembly 70 that includes a light sensor 72 for sensing light.

It is to be understood that the assemblies 44, 48, 52, 62, 66, and 70 include respective processors 74, 76, 78, 80, 82, and 84 for causing each assembly's respective sensor to sense, gather, and/or receive information from the respective sensor in accordance with present principles. The respective processors 74, 76, 78, 80, 82, and 84 also communicate with respective sensor communication interfaces 98, 100, 102, 104, 106, and 108 in accordance with present principles to send information sensed, gathered, and/or received or the like from each assembly's respective sensor to the sensor communication interface 30 of the AVDD 12 for presentation thereon. It is to be understood that the communication interfaces referenced herein, including the interfaces 30, 34, 98, 100, 102, 104, 106, and 108 may support and/or include a universal serial bus (USB) connection, wired TCP/IP, WiFi TCP/IP, and/or built-in RF transceivers (such as ZWAVE, ZigBee, etc.) in non-limiting embodiments. Furthermore, if desired, the respective processors 74, 76, 78, 80, 82, and 84 of the assemblies 44, 48, 52, 62, 66, and 70 may store the information from the respective sensors on respective storage mediums 86, 88, 90, 92, 94, and 86.

One or more biometric sensors 109 may also be provided and may send signals representing biometric parameters of a person to the AVDD. A biometric sensor typically may include a processor "P", computer memory "M", and communication interface "CI" according to principles above. Non-limiting examples of biometric sensors include heart rate sensors, temperature sensors, blood pressure sensors, blood sugar sensors, and the like.

Moving now to FIG. 2, a flow chart of example logic an AVDD, such as the AVDD 12, executes in accordance with present principles is shown. Beginning with block 110, in an example embodiment one or more sensors such as the irrigation valve sensor or the pool heater sensor referenced above can be discovered through device discovery principles known in the art, although in other embodiments a user can enter sensor communication information into the AVDD to establish communications manually. E.g., the sensors may be discovered based on wireless signals emitted by a sensor within a particular radius of a given location, such as a personal residence. Moving from block 110 to block 112, the logic prompts a user of the AVDD to decide to connect to the one or more sensors that were discovered at block 110. If the user provides input, e.g. via a remote commander such as the RC 26 described above, in response to the prompt commanding the AVDD to connect to the discovered sensors, the logic continues to block 114.

At block 114, the logic "pushes" and/or provides an application programming interface (API) from the AVDD to the sensor(s). However, it is to be understood that in some embodiments, the API may be provided by a manufacturer of the AVDD to an entity affiliated with the sensor(s) in accordance with present principles, rather than having the AVDD push the API to the sensors. In such an embodiment, the sensor(s) and/or their processors are already capable of providing information in the desired API when the sensor is discovered back at block 110. Thus, in non-limiting embodiments an entity affiliated with the sensor(s) may be, e.g., a sensor manufacturer vending sensor(s) already being able to provide information in the appropriate API. In other instances, e.g., an entity affiliated with the sensor may be a third party such as a sensor technician that provides and/or pushes the API to the sensor when installing the sensor at a particular location (and thus prior to being discovered by the AVDD in accordance with present principles).

Continuing in reference to FIG. 2, at block 116 the logic receives information back from the sensor(s). Concluding FIG. 2 at block 118, the information from the sensor(s) is displayed on the AVDD in accordance with the API.

Thus, it is to be understood that one or more sensors such as but not limited to the sensors described herein include respective processors accessing the API and sending the information to an AVDD such as the AVDD 12 in accordance with the API. To reiterate, sensors in accordance with present principles may include, but are not limited to, environmental sensors, ambient light sensors (such as photodiodes in monitored rooms or areas), door position sensors, window covering position sensors, pool heater energization sensors, motion sensors (such as the motion sensor(s) described in U.S. Pat. No. 7,755,052, incorporated herein by reference), valve position sensors, biometric sensors, and/or other sensors including simple switch sensors.

Now referring to FIG. 3, a schematic diagram showing a data structure of an exemplary API that may be pushed and/or provided by the AVDD to various sensors automatically when the viewer selects to connect to discovered sensors, or that may be published by a manufacturer of the AVDD to sensor manufacturers so that the sensor manufacturers may pre-program their sensors with the API, is shown. It is to be understood that the API defines, relative to the information from the sensor, content in the information from the sensor to be presented on a display of an AVDD, such as the display 24 referenced above. In some embodiments the API also defines when and where the content is to be presented on the display.

Thus, as may be appreciated from FIG. 3, a data structure 120 includes various parameters, such as whether an icon from a sensor should be presented, whether an icon from an AVDD such as the AVDD 12 should be presented, and/or whether alpha-numeric information from the sensor should be presented. Accordingly, content parameters 122 can include types of content to be presented, such as one or more icons and/or alpha-numeric information. Furthermore, in some embodiments the content may include, e.g., only one icon or only alpha-numeric information. As may also be appreciated from FIG. 3, the data structure 120 may also include parameters 124 regarding where and/or how content should be presented. For example, content may be presented in a full-screen mode such that only the content is displayed, or in, e.g., a bottom portion of the display or a top portion of the display such that the content may be simultaneously displayed with unrelated content such as a television program or motion picture.

In addition to the above, the data structure 120 may also include parameters 126 regarding when the content from the sensors should be presented. For example, content may be presented only upon receipt of the content or information, and/or receipt of a message containing the content and/or information. Accordingly, in non-limiting embodiments extensible markup language (XML) messaging may be used such that, e.g., the XML is used to encapsulate the content, information, and/or message. Alternatively or in addition to the above, content may be presented at predetermined intervals, such as, e.g., every 5 minutes or every hour. Thus, FIG. 3 shows that the data structure 120 includes a parameter for both presenting content upon receipt and at least one reminder, such as five minutes after the content is received. If desired, reminders can also be repeatedly presented at predetermined intervals. Furthermore, in some embodiments audio alerts and/or audible content pertaining to information and/or content received from the sensor(s) may be presented on the AVDD through, e.g., the speakers 20, in lieu of or in addition to presentation of visual content.

Figure 4:
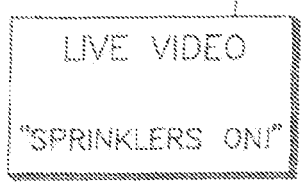
FIGS. 4-10 illustrate example screen shots from the AVDD presenting example information from various sensors shown in FIG. 1.
Figure 5:
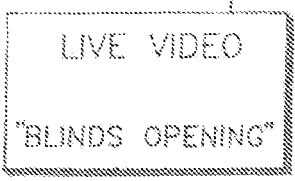
Figure 6:
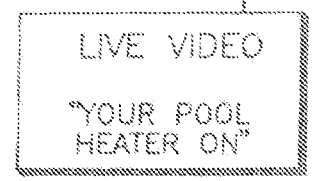
Figure 7:
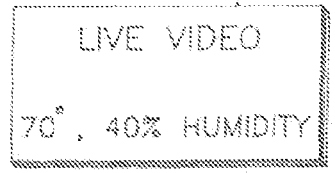
Figure 8:
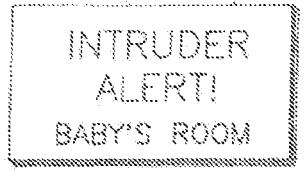

Now in reference to FIGS. 4-10, illustrative exemplary screen shots from an AVDD presenting information and/or content from various sensors such as those referenced above are shown. Thus, FIG. 4 shows that live video may be displayed along with a visual indication on the bottom portion of a display, such as the display 24 referenced above, that an irrigation system such as lawn sprinklers is on, being based on information received from a valve position sensor. FIG. 5 shows that live video may be displayed along with a visual indication on the bottom portion of the display that window blinds are opening, being based on information received from a window coverings position sensor. FIG. 6 shows that live video may be displayed along with a visual indication on the bottom portion of the display that a pool heater is on, being based on information received from a pool heater sensor. FIG. 7 shows that live video may be displayed along with a visual indication on the bottom portion of the display of non-limiting environmental statistics such as temperature and humidity levels, being based on information received from an environment sensor. FIG. 8 shows that a visual indication may be presented on the display indicating, e.g., an "intruder alert" based on the motion of a person sensed by a motion sensor.

Figure 9:
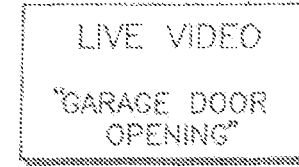
Figure 10:
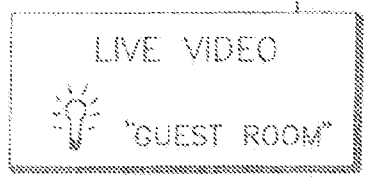

Continuing in reference to the exemplary screen shots disclosed herein. FIG. 9 shows that live video may be displayed along with a visual indication on the bottom portion of the display that the garage door of the residence where the AVDD is disposed is opening, being based on information received from a door position sensor. Concluding with FIG. 10, live video may be displayed along with a visual indication including an icon on the bottom portion of the display that a light has been turned on in another room of a personal residence in which the AVDD is disposed, being based on information received from a light sensor.

Additionally, note that a user of an AVDD such as the AVDD 12 may choose whether or not to display information and/or content from the sensors in accordance with present principles. Thus, for example, a user interface may be presented on the AVDD allowing a user to enable presentation of the information and/or content from one or more sensors, or to disable presentation of the information and/or content. Furthermore, it is to be understood that one AVDD presenting information and/or content may, e.g. using Internet capabilities, forward the information and/or content to other AVDDs for presentation thereon. Thus, for example, an AVDD such as a TV may present a user interface to a user allowing the user to forward information and/or content from one or more sensors from the TV to the user's laptop computer or smart phone so that the information and/or content may still be monitored by a user when not viewing the TV.

Figure 11:
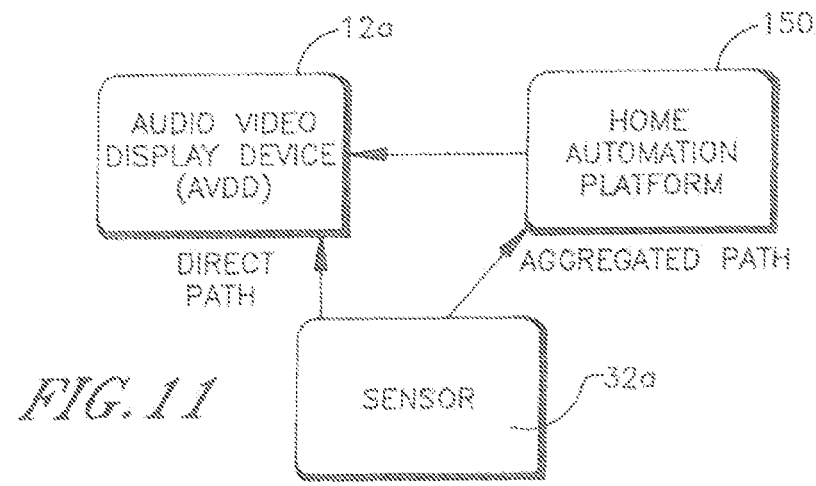
FIG. 11 is a block diagram of another example system.

FIG. 11 shows an alternate system in which an AVDD 12a may communicate with one or more sensors 32a along a direct communication path, which portion of the system can be identical in operation and configuration to the system shown in FIG. 1. In addition, a home automation platform (HAP) 150 such as, for example, a computer with processor, computer readable medium, display, input device, etc. may receive information from the sensor 32a along an aggregate path and provide aggregated sensor information to the AVDD 12a as shown. Thus, when the sensor 32a is a power sensor such as a current sensor, information from it can be aggregated over a period of time, e.g., 24 hours, by the HAP 150 and then the aggregated sensor information, in this example, total power usage for the past 24 hours, can be presented on the AVDD 12a along with current power use provided from the sensor 32 along the direct path as shown.

Furthermore, the HAP 150 (or a sensor or the AVDD or a cloud server) can aggregate data from multiple sensors and provide that aggregated data to the AVDD 12a. For example, the HAP 150 may provide to the AVDD 12a for display data indicating that a thermostat has reached a threshold and is activating a climate control unit such as a heater or air conditioner in response, as indicated by a climate control sensor, that the fan associated with the unit is at a particular speed as indicated by a fan speed sensor, and that the current room temperature as sensed by a temperature sensor is at a particular value. In essence, the HAP 150 correlates input from different but related sensors and provides that input to the AVDD for convenient simultaneous presentation of the various inputs from the different but related sensors. Furthermore, the provision of the HAP 150 facilitates the AVDD working with legacy sensors that may not have the capability to execute the API discussed above but that can communicate with the HAP 150 using legacy protocols different from the above-discussed API, with the HAP 150 then communicating with the AVDD using the above-discussed API.

In some examples, one or more of the devices above (e.g., the HAP or AVDD) monitor plural sensors as described and output an event only if two or more sensor outputs meet "event" criteria. For example, a sound sensor and a motion sensor may both output signals representing the presence of moving humans and animals, and an event "intruder alert" may be generated only responsive to both sensor signals indicating an intruder, i.e., only in response to the sound sensor outputting a signal indicating noise or human speech above (or below) a threshold and the motion sensor indicating a moving object. Responsive to only one sensor outputting a signal indicating an intruder, the "intruder alert" may not be presented, e.g., on the AVDD, in audible and/or visible form. The intruder alert may be sent to the cloud (Internet) for provisioning of the alert to, e.g., a wireless device registered in the cloud to the owner of the premises in which the sensors are disposed, and/or to law enforcement agencies.

As a further example, a "medical alert" may be generated by, e.g., the HAP or AVDD responsive to two or more biometric sensors outputting signals satisfying a medical alert threshold, but not responsive to only a single biometric sensor outputting such a signal. For example, a "medical alert" may be output (locally and/or to the cloud) responsive to two or more biometric sensors outputting signals satisfying "alert" thresholds. Thus, a medical alert may be generated only responsive to both a heart rate sensor indicating a pulse in excess of a threshold and a temperature in excess of a threshold, but not responsive to only a single biometric sensor outputting a signal indicating a medical emergency.

Figure 12:
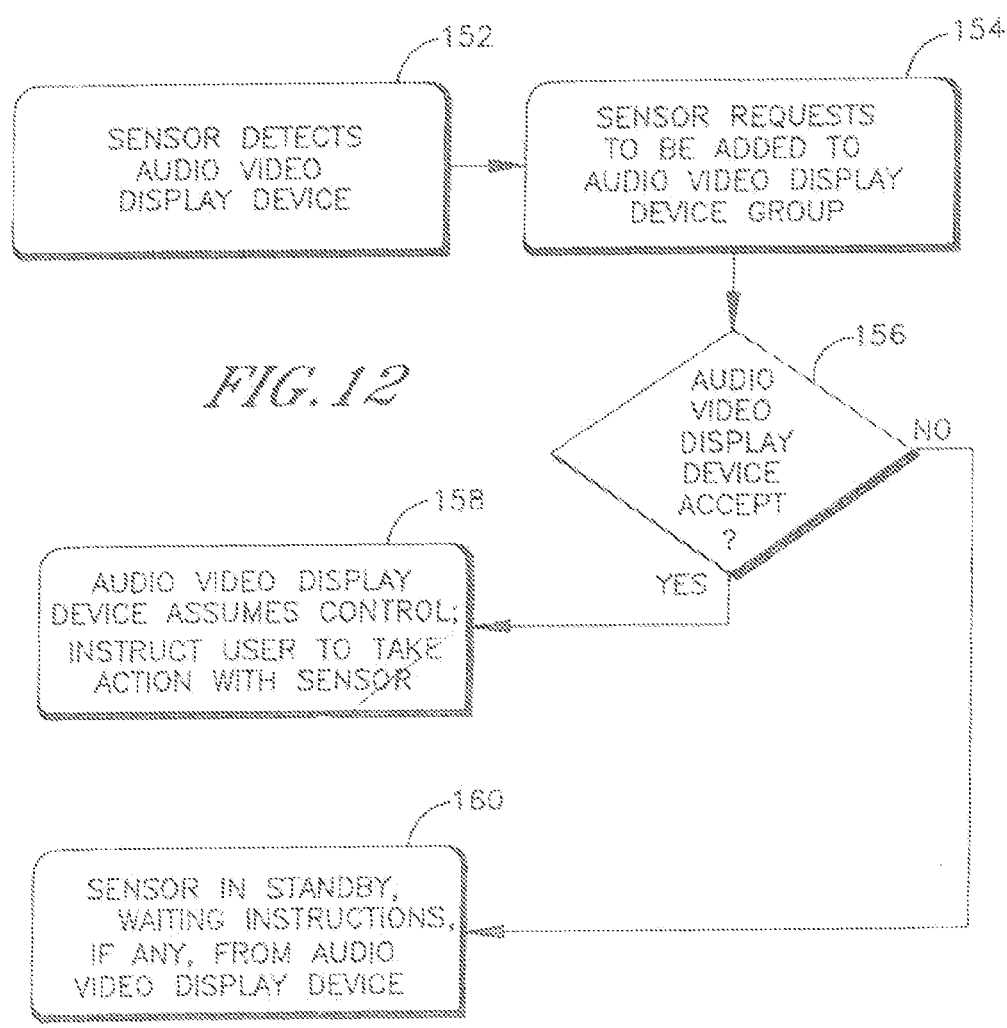
FIG. 12 is a flow chart of alternate sensor-driven discovery logic.

FIG. 12 illustrates that device discovery may be initiated on the sensor side, commencing at block 152. When a sensor discovers the AVDD it may request to be added to the AVDD's sensor group at block 154, and if the AVDD accepts the sensor at decision diamond 156, the AVDD assumes control of communication with the sensor at block 158. This may include presenting an onscreen instruction to the user to take particular action with respect to the sensor, e.g., operating a button or key on the sensor in a particular fashion to authenticate the sensor to the AVDD. The AVDD can then accept further communication from the sensor.

On the other hand, if the AVDD does not accept sensor communication at decision diamond 156 the logic flows to block 160 in which the sensor waits in standby for future instructions, if any, from the AVDD.

While the particular HOME AUDIO VIDEO DISPLAY DEVICE (AVDD) AS SENSOR MONITOR is herein shown and described in detail, it is to be understood that the subject matter which is encompassed by the present invention is limited only by the claims.

What is claimed is:
1. Apparatus, comprising:
at least one computer memory that is not a transitory signal and that includes instructions executable by at least one processor to configure the processor to:
send to at least one sensor an application programming interface (API) defining one or more of: (a) content in information received from the at least one sensor to be presented on a display, (b) where the content is to be presented on the display, (c) when the content is to be presented on the display;
receive information from the at least one t sensor conforming to the API; and
present the information from the at least one sensor on the display in accordance with the API.
2. The apparatus of claim 1, wherein the API defines, relative to the information from the at least one sensor, two or more of: content in the information from the at least one sensor to be presented on the display, where the content is to be presented on the display, and when the content is to be presented on the display.

3. An audio video device (AVD), comprising:

at least one processor;

a computer memory accessible to the processor and programmed with instructions that cause the processor to:

send to at least one sensor an application programming interface (API) defining one or more of (a) content in information received from the at least one sensor to be presented on a display, (b) where the content is to be presented on the display, (c) when the content is to be presented on the display;

receive information from the at least one sensor conforming to the API; and present the information from the at least one sensor on the display in accordance with the API.

4. The AVD of claim 3, wherein the API defines, relative to the information from the first sensor, two or more of content in the information from the first sensor to be presented on the display, where the content is to be presented on the display, and when the content is to be presented on the display.

* * * * *